United States Patent [19]
Ojima

[11] 4,029,915
[45] June 14, 1977

[54] MINIATURIZED CALCULATOR KEYBOARD SWITCH ASSEMBLY HAVING UNIVERSALLY PIVOTED KEY ACTUATORS

[75] Inventor: Shin Ojima, Yao, Japan

[73] Assignee: Hoshidenkoseizo Kabushiki Kaisha, Yao, Japan

[22] Filed: Dec. 3, 1975

[21] Appl. No.: 637,264

[30] Foreign Application Priority Data
Dec. 12, 1974 Japan .................. 49-143295

[52] U.S. Cl. .................. 200/5 A; 200/6 A; 200/159 B; 200/340; 197/102; 235/156

[51] Int. Cl.² .................. H01H 13/70; H01H 25/00; G06F 7/38

[58] Field of Search .......... 200/1 R, 5 R, 5 A, 6 A, 200/85, 86 R, 159 A, 159 B, 264, 329, 330, 336, 339, 340; 197/98, 100, 102; 179/90 K; 58/152 R; 235/156

[56] References Cited
UNITED STATES PATENTS

| | | | |
|---|---|---|---|
| 2,916,566 | 12/1959 | Meyer et al. | 200/5 R |
| 3,005,055 | 10/1961 | Mattke | 200/6 A X |
| 3,033,946 | 5/1962 | Meyer et al. | 200/6 A |
| 3,399,287 | 8/1968 | Euler | 200/339 X |
| 3,483,337 | 12/1969 | Johnstone et al. | 200/6 A |
| 3,617,660 | 11/1971 | Krakinowski | 200/5 R X |
| 3,633,724 | 1/1972 | Samuel | 197/102 X |
| 3,691,324 | 9/1972 | Brantingson | 200/5 A X |
| 3,699,294 | 10/1972 | Sudduth | 200/159 B |
| 3,803,834 | 4/1974 | Reese | 38/152 R |
| 3,818,153 | 6/1974 | Arvai | 200/5 A |
| 3,899,648 | 8/1975 | Murata | 200/5 A X |
| 3,917,917 | 11/1975 | Murata | 200/5 A X |
| 3,996,430 | 12/1976 | Eberwein et al. | 200/5 A |
| 4,007,364 | 2/1977 | Ojima | 235/152 |

Primary Examiner—James R. Scott
Attorney, Agent, or Firm—Pollock, Vande Sande & Priddy

[57] ABSTRACT

A portable electronic calculator comprises a calculator body which supports a keyboard consisting of a single elongated row of keys each of which is adapted to be tilted in any one of four directions by the finger tip of a user to input a selected one of four different information signals from said key to a calculator circuit located within the body. The results of the calculation are supplied to an indicator circuit in the body for viewing by the user through an elongated indicator opening which is disposed in alignment with the row of keys.

2 Claims, 14 Drawing Figures

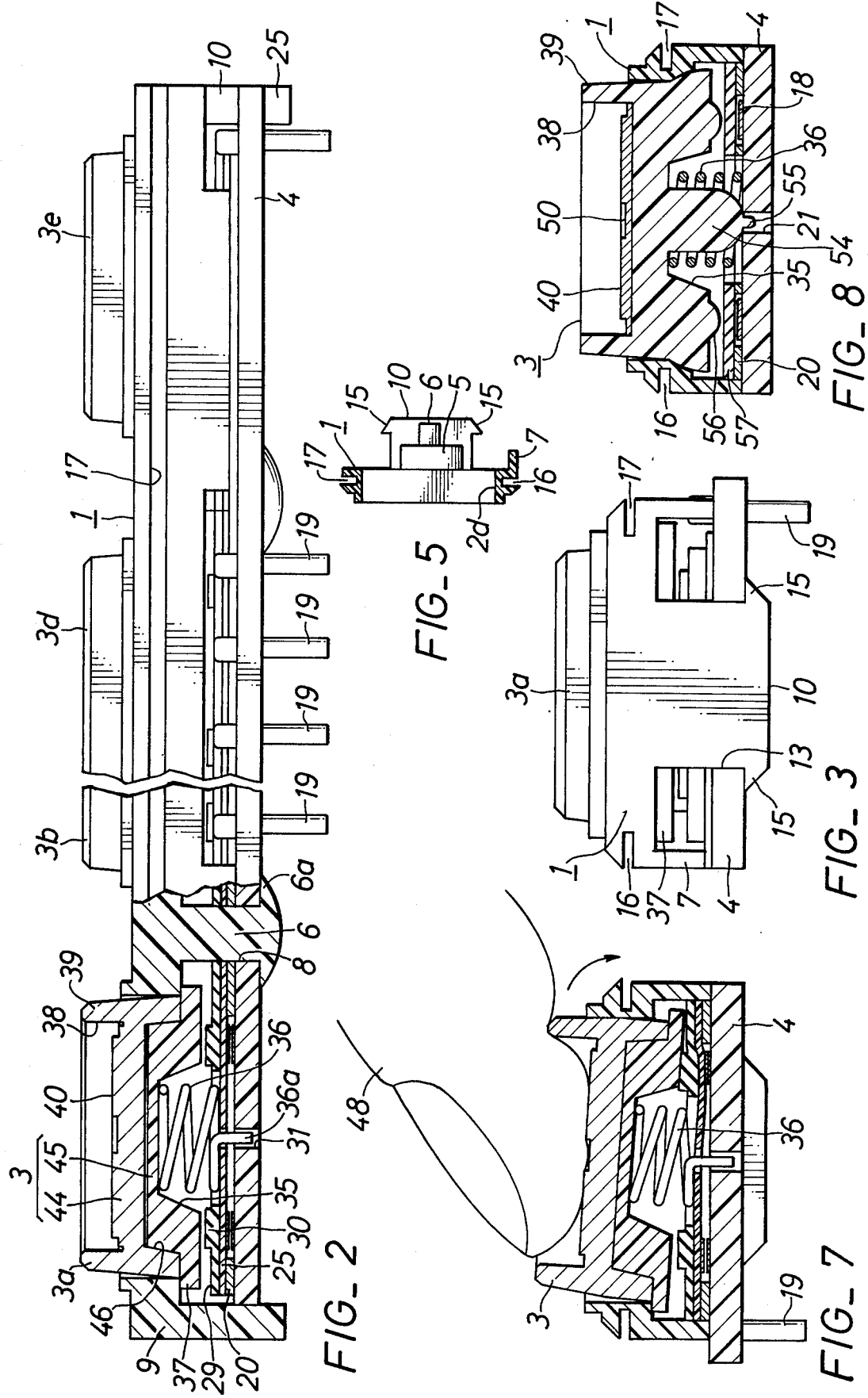

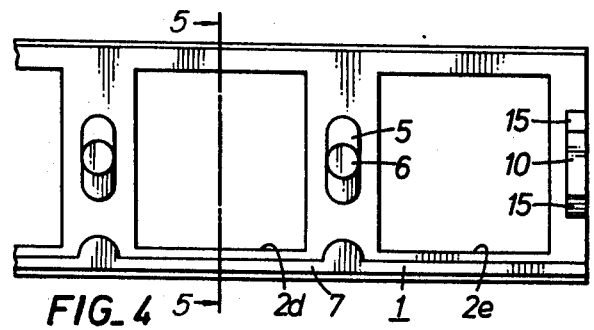
FIG_4
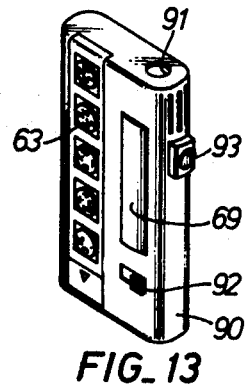
FIG_13
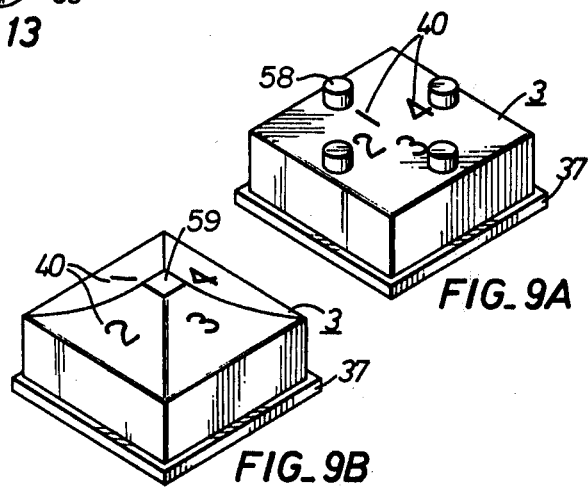
FIG_9A
FIG_9B

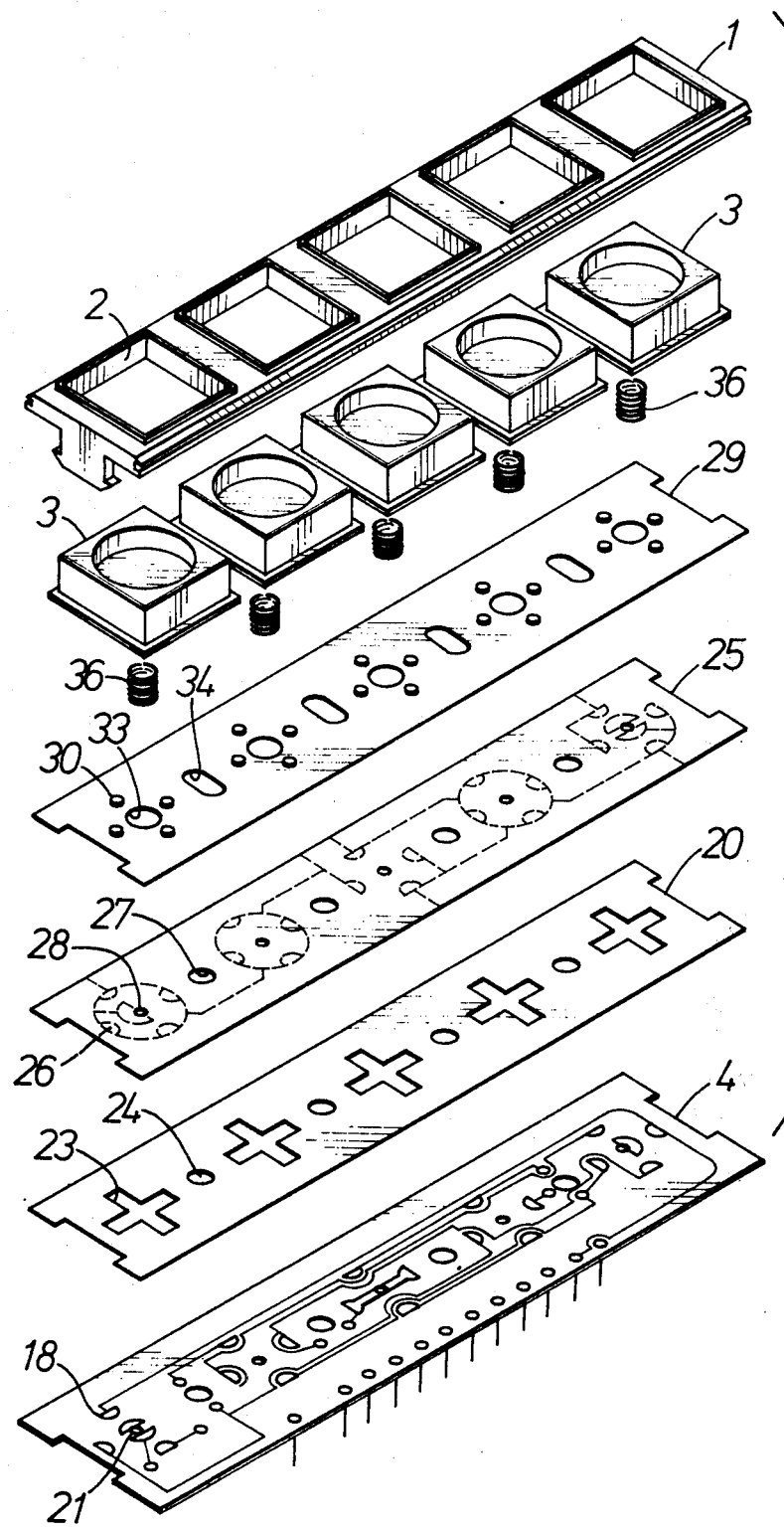
FIG_6

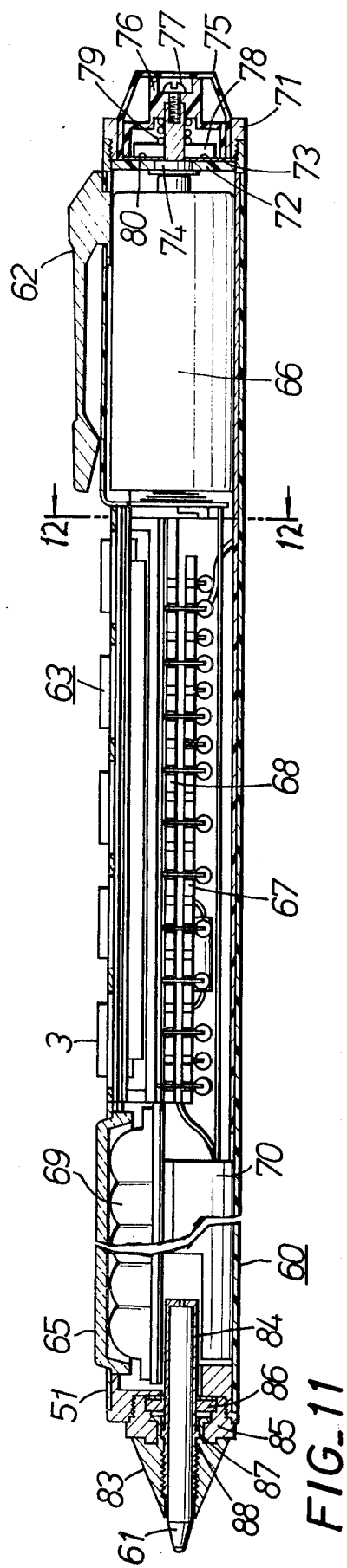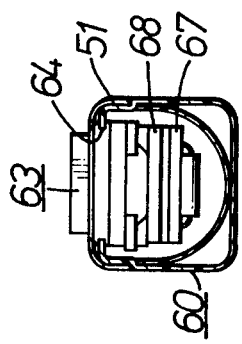

MINIATURIZED CALCULATOR KEYBOARD SWITCH ASSEMBLY HAVING UNIVERSALLY PIVOTED KEY ACTUATORS

BACKGROUND OF THE INVENTION

1. Field of the Invention

This invention relates to an improved keyboard switch arrangement and more particularly to a keyboard for selective inputting of information such as numerals or the like which is suitable for use, for example, in a miniature electronic calculator.

2. Description of the Prior Art

The keyboard of conventional desk-top electronic calculators comprises keys respectively corresponding to numerals 0 to 9 and the keys are selectively operated to input desired ones of the numerals. Where the keys are disposed close to adjacent ones of them and reduced in size for miniaturization purposes, there is a very strong possibility of simultaneously depressing two adjacent keys to provide false input information. To avoid this, the keyboard switch occupies the largest part of the desk-top electronic calculator. Further, since the keys are operated one by one for each input information, speeding up of the operation speed is inevitably limited.

SUMMARY OF THE INVENTION

One object of this invention is to provide a keyboard switch array which is remarkably small but practically free from input errors.

Another object of this inventon is to provide a keyboard switch array which is remarkably small but easy to handle.

Another object of this invention is to provide a keyboard switch array which is very small but capable of high-speed operation.

Another object of this invention is to provide a keyboard switch which is very small and gives a soft touch to the user's finger tip during operation.

Another object of this invention is to provide an improved keyboard switch and associated indicator arrangement which is particularly suitable for use in an electronic calculator built in a pen or the like.

Still another object of this invention is to provide a keyboard switch arrangement which is suitable for use in an electronic calculator built in a gas lighter.

According to this invention, an improved keyboard is provided wherein keys are each disposed in a plurality of aligned openings formed in a frame in such a manner as to project out from the front surface of the frame. A printed circuit board is fixedly mounted on the back of the frame in opposing relation thereto and a contact holder formed of a flexible insulating film is interposed between the frame, the keys and the printed circuit board. The contact holder has printed thereon movable contacts on the side of the printed circuit board. And the printed circuit board has also printed thereon a plurality of fixed contacts corresponding to the keys in opposing relation to the above said movable contacts. The keys are each supported to be capable of freely rocking in such a manner that its axis perpendicular to the printed circuit board may be tilted in a plurality of directions. When the key is depressed by a finger tip at a desired side, the movable contact corresponding to the side at which the key has been depressed is urged against the fixed contact disposed opposite to the movable contact. Upon removal of the finger tip from the key, the key is automatically returned by a resilient member to its initial position and the movable contact is also disengaged from the fixed contact by the restoring force of the contact holder. Accordingly, by selecting the direction of tilting of the key, different information contents can be input with one key. Therefore, a large amount of information such as numerals, symbols, functions, etc. can be input with a small number of keys. This permits miniaturization of the keyboard switch.

Further, the front surface of the key has formed therein a depression or projection to facilitate tilting of the key. That is, the key can be easily tilted in a desired direction with a finger tip put on the depression or projection. Symbols indicative of the information contents to be input are disposed on the front surface of the key about its center of rocking to indicate the directions in which the key should be tilted for inputting individual information contents. The above resilient member for returning the key to its initial position may be, for example, a coiled spring. The back of the key has a recess formed centrally thereof. One end of the coiled spring is retained on the bottom of the recess and the other end is urged against the printed circuit board directly or through that part of the contact holder on which no movable contact is disposed, so that the key is always biased outwardly. In this case, the coiled spring is disposed with its axis substantially in alignment with the center of rocking of the key. The formation of the recess in the back of the key reduces the overall thickness of the keyboard switch.

To ensure that the movable contact at the side where the key is depressed may be urged into contact only with fixed contact corresponding to the movable contact, driving projections are formed on the back of the key in opposing relation to the fixed contacts. Moreover, a sheet-like buffer member is inserted between the contact holder and the keys to give a relatively soft touch to the user's finger tip in the operation of the individual keys. In the case where driving projections are formed on the buffer member on the side of the key in opposing relation to the fixed contacts, the aforementioned projections formed on the back of the key may be omitted. It is also possible to use a conductive rubber sheet as the buffer member, the contact holder and the movable contacts.

With such an arrangement, it is possible to obtain a remarkably small keyboard consisting of comparatively few keys disposed in a single row. Accordingly, it is possible to provide a combination of, for example, a ball-point pen with a miniature electronic calculator by mounting such a small keyboard on the body of the pen and by incorporating in the body of the pen an operation unit and an indicator unit respectively formed with semiconductor integrated circuits, a battery for actuating them and so on. Similarly, such a miniature electronic calculator can also be built in, for example, a cigarette lighter. Accordingly, anyone can always take the calculator with him and hence calculate anywhere. Thus, the keyboard of this invention is of particular utility when employed in miniature electronic calculators.

BRIEF DESCRIPTION OF THE DRAWINGS

FIG. 2 is a front view of the keyboard of FIG. 1, partly in section along the line 2—2 in FIG. 1;

FIG. 3 is a right side view of the keyboard of FIG. 1;

FIG. 4 is a rear view of one part of a keyboard frame;

FIG. 5 is a cross-sectional view taken on the line 5—5 in FIG. 4;

FIG. 6 is an exploded view of the keyboard of FIG. 1;

FIG. 7 is a cross-sectional view for explaining a switch operation;

FIG. 8 is a cross-sectional view illustrating another example of the calculator keyboard switch of this invention;

FIGS. 9A and 9B are perspective views showing modified forms of a key;

FIG. 11 is a cross-sectional view taken on the line 11—11 in FIG. 10;

FIG. 12 is a cross-sectional view taken on the line 12—12 in FIG. 11; and

FIG. 13 is a perspective view showing one example of a gas lighter having built therein the miniature electronic calculator employing the keyboard of this invention.

DESCRIPTION OF THE PREFERRED EMBODIMENTS

Figure 1:
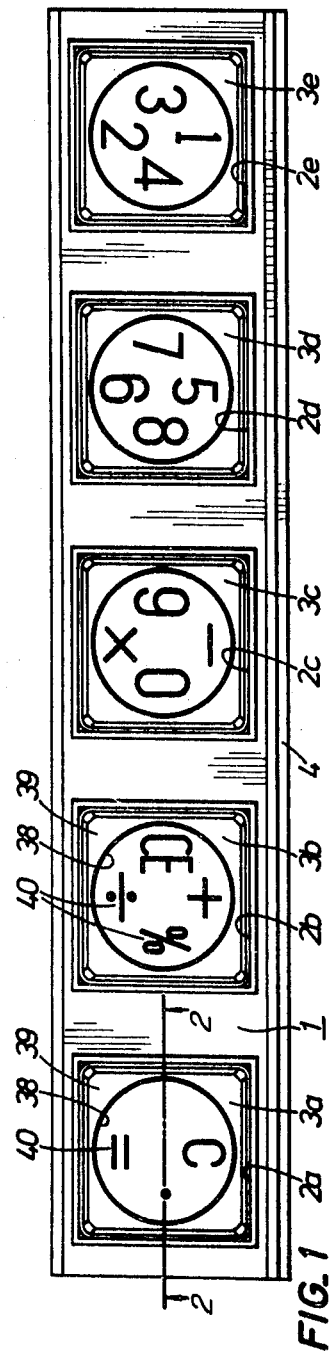
FIG. 1 is a plan view showing one example of the calculator keyboard of this invention.

Referring first to FIGS. 1 to 3, a frame 1 of a rectangular configuration, which is formed of a synthetic resin material such, for example, as ABS resin, has formed therein in its lengthwise direction five openings 2a to 2e which are aligned in relatively close but equally spaced relation to one another. These openings 2a to 2e are, for example, square and of the same size. In these openings 2a to 2e keys 3a to 3e are demountably disposed. A printed circuit board 4 is mounted on the frame 1 in opposing relation to the back thereof. As shown in FIGS. 4 and 5, the back of the frame 1 has small pedestals 5 formed integrally therewith midway between adjacent openings, the pedestals each having a pin 6 integrally therewith, and a rib 7 of the same height as the calculator small pedestals 5 is formed as a unitary structure with the frame 1 along one marginal edge of its back. The pins 6 are respectively inserted in apertures 8 formed in the printed circuit board 4 in alignment with the pins. The end portions of the pins 6 projecting out from the printed circuit board 4 are heated and then crushed to form flanges 6a, by which the printed circuit board 4 is fixedly pressed against the pedestals 5 and the rib 7. Further, the frame 7 has, at its both ends, engaging leg pieces 9 and 10 formed integrally therewith to project from its back. The end portions of the engaging leg pieces 9 and 10 are pressed into notches 13 and 14 (14 not shown) formed in the printed circuit board 4 at its both ends, projecting out from the back of the printed circuit board 4. The projecting end portion of each engaging leg piece has tapered engaging members 15 formed integrally therewith and these engaging members 15 engage the printed circuit board 4, thus ensuring to prevent the printed circuit board 4 from coming off the frame 1. After the above engagement of the engaging members 15 with the printed circuit board 4, the above-mentioned heat caulking of the end portions of the pins 6 is carried out. Engaging grooves 16 and 17 are formed in the front and rear sides of the frame 1 for the purpose of assembling the keyboard of this invention with the calculator body on which the keyboard is mounted.

As shown in FIG. 6, the printed circuit board 4 has printed thereon on the side of the frame 1 four fixed contacts 18 at those positions respectively corresponding to the centers of the four sides of each key 3, and wiring is also printed as required. Further, required wiring is printed in the back of the printed circuit board 4, too, and a plurality of terminal pins 19 (see FIGS. 2 and 3) are planted along one marginal edge of the printed circuit board 4 on the opposite side from the rib 7 of the frame 1. Pin-holes 21 are each bored through the printed circuit board 4 at the center about which the four fixed contacts 18 corresponding to each of the keys 3 are disposed. As shown in FIG. 6, a spacer 20 of an insulating film such as a polyester film is disposed on the printed circuit board 4 on the side of the frame 1. The spacer 20 has formed therein cruciform apertures 23 in opposed relation to the respective keys 3 and the four ends of each aperture 23 are respectively adjacent to the fixed contacts 18. Further, the spacer 20 has bored therethrough pin-holes 24 for receiving the pins 6.

A contact holder 25 formed of a flexible insulating film as of polyester is mounted on the spacer 20 on the side thereof toward the frame 1. The contact holder 25 has printed thereon on the side thereof toward the printed circuit board 4 movable contacts 26 respectively corresponding to the fixed contacts 18 and wirings interconnecting the movable contacts 26 are also printed. In the present example, the movable contacts 26, except one of them, are interconnected in two common contact groups. The contact holder 26 has formed therein pin-holes 27 and through holes 28 through which the pins 6 and bent ends of springs described later on are respectively inserted. A sheet-like buffer member 29 formed a material such as of silicone rubber is disposed on the contact holder 25 on the side thereof toward the frame 1. The buffer member 29 has driving projections 30 formed integrally therewith on the side thereof toward the frame 1 at those positions respectively corresponding to the movable contacts 26, circular holes 33 each formed therein inside of each quartet of projections 30 in opposing relation to the keys 3 and through holes 34 in which the aforementioned small pedestals 5 are inserted.

As shown in FIG. 2, a recess 35 is formed in the back of each key 3 facing the printed circuit board 4. In the recess 35, a coiled spring 36 is disposed with its axis substantially perpendicular to the printed circuit board 4. The coiled spring 36 is urged at one end against the bottom of the recess 35 and at the other end against the printed circuit board 4 through the circular hole 33 of the buffer member 29 and the contact holder 25, by which the key 3 is biased outwardly of the frame 1. A flange 37 is formed on the periphery of the base of the key 3 to serve as a stopper of the key. The end portion of the coiled spring 36 on the side of the printed circuit board 4 is bent at the position of its axis substantially at right angles to extend toward the printed circuit board 4, as indicated by 36a. The bent portion 36a of the coiled spring 36 is inserted into the pin-hole 21 of the printed circuit board 4 through the pin-hole 28 of the contact holder 25, thus positioning the coiled spring 36 at one end on the printed circuit board 4. On the side of the key 3, the other end of the coiled spring 36 is positioned by the recess 35.

On the front surface of the key 3, a depression or projection is formed to allow ease in the operation of the key 3. In the present example, a circular depression 38 is formed to occupy the larger part of the front surface of the key 3, providing a ring-shaped raised portion 39 along the marginal edge of the front surface of the key 3. The front surface of the key 3 has provided thereon indications 40 indicative of the information contents to be input by the operation of the key 3. In this example, by changing the direction of tilting of the key 3, four contents of information can be input and, in the depression 38, four indications 40 are respectively disposed at the sides corresponding to the directions in which the key 3 is tilted with respect to its center of rocking. In the present example, the key 3 is composed of an indication part 44 formed of a metal and a key body 45 of a synthetic resin material. The indication part 44 has the depression 38 formed in a thick, square piece of aluminum, the indications 40 being formed by chemical etching techniques in the bottom of the depression 38 and a hole 46 formed in the back of the aluminum plate to receive the key body 45. In this case, the body 45 is fitted into the hole 46, with the flange 37 formed as a unitary structure with the body 45 projecting out from the outer periphery of the indication part 44.

For the operation of the keyboard switch of this invention described in the foregoing, it is sufficiently only to depress the key 3 with a finger tip at the side of the indication 40 indicative of the content of information desired to input. Namely, in FIGS. 7A and 7B, the finger tip 48 is put on the depression 38 of the key 3 having the indication 40 indicative of the content of information to be input and then finger tip 48 is pressed obliquely toward the desired indication, by which the key 3 is tilted. When the key 3 is thus tilted, the back of the key 3 presses one of the driving projections 30, by which the movable contact 26 corresponding thereto is urged into engagement with one fixed contact 18 corresponding thereto through the cruciform aperture 23 of the spacer 20. Upon removal of the finger tip 48 from the key 3, the key 3 is returned by the restoring force of the coiled spring 36 to its initial position and the movable contact 26 is also disengaged by the restoring force of the flexible contact holder 25 from the fixed contact 18. In this manner, by tilting one key in four directions, four switches can be selectively operated. As compared with conventional keyboards of the type employing the same number of keys as the switches used, the keyboard of this invention can be constructed remarkably small, for example, 60 mm long, 10 mm wide and 5 mm thick. The keys of substantially the same size as those in the prior art can be used and this diminishes the possibility of erroneous input operation. Since a plurality of contents of information can be input with one key, it is possible to continuously input the information contents without removing the finger tip from the key according to the input information. Consequently, the keys can be operated at high speed. In the case where the key 3 has the ring-shaped raised portion 39, the operation can be readily achieved by hooking the finger tip at the inner edge of the raised portion 39. The buffer member 29 gives a soft touch to the finger tip depressing the key.

FIG. 8 illustrates a modified form of the keyboard switch of this invention. In this example, the indication part 44 and the body 45 of the key are formed of a synthetic resin material as a unitary structure with each other. A plate 50 having deposited thereon the indications 40 is fitted into the depression 38 and bonded thereto. Further, the recess 35 has a centrally disposed shaft member 54 formed integrally with the key 3 and the end face of the shaft member 54 is hemispherical. At the tip of the hemispherical end face, a lug 55 is formed integrally with the shaft member 54 and is inserted into the pin-hole 21 of the printed circuit board 4. Thus, the axis of the key 3 can be tilted about the end face of the shaft member 54. Further, the back of the key 3 has formed integrally therewith driving projections 56 respectively in alignment with the fixed contacts 18. Therefore, the projections 30 of the buffer member 29 can be left out. Moreover, in the present example, the contact holder 25, the movable contacts 26 and the buffer member 29 are replaced with one conductive rubber sheet 57, which is disposed between the spacer 20 and the frame 1. Upon depression of the key 3, a selected one of the projections 56 urges the conductive rubber sheet 57 into contact with the fixed contact 18 corresponding to the selected projection 56. In the case where it is difficult to use one movable contact in common to all of the fixed contacts, it is sufficient only to use a plurality of conductive rubber sheets arranged in the lengthwise direction of the frame. Such various modifications of these elements can be adopted independently of one another. For example, in the foregoing example, the contact holder 25, the movable contacts 26 and the buffer member 29 are omitted but instead the conductive rubber sheet 57 is used and the projections 30 are formed integrally with the rubber sheet 57. The same is true of the other elements. It is also possible to form a shaft member similar to the above-said one 54 on the printed circuit board 4, to engage its hemispherical end face with a hemispherical engaging recess formed in the bottom of the recess 35 at the center thereof and to tilt the key about the hemispherical end face of the shaft member. The depression or projection for facilitating the tilting of the key may also be such as shown in FIG. 9A in which small projections 58 are formed on the front surface of the key, or in FIG. 9B in which a small projection 59 is formed on the front surface of the key as a unitary structure therewith at its center.

Figure 10:
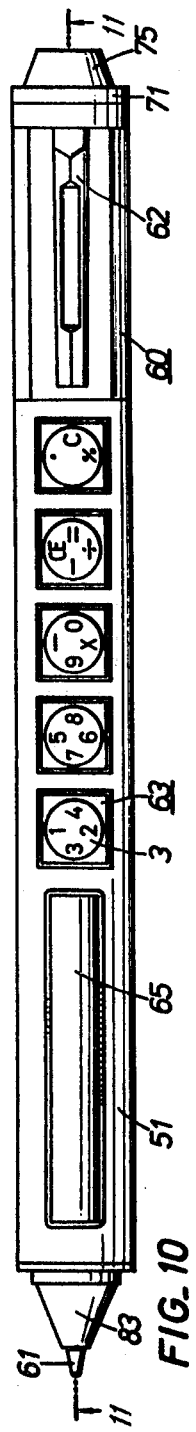
FIG. 10 is a plan view illustrating one example of a pen having incorporated therein a miniature electronic calculator employing the keyboard of this invention.

Turning now to FIGS. 10 to 12, a description will be given of a miniature electronic calculator employing the improved keyboard of the present invention. In the illustrated example, the electronic calculator is combined with a ball-point pen. As shown in FIGS. 10 to 12, a ball-point 61 is demountably attached to one end of a tubular body 60 and a clip 62 is mounted on the other end portion of the tubular body 60. A keyboard comprising a plurality of aligned switches 63 constructed and operative in the manner described above, is disposed on the tubular body 60 between the clip 62 and the pen 61. The mounting of the array of switches 63 on the tubular body 60 is carried out by engaging grooves 16 and 17 in both marginal edges of the frame 1 of the keyboard with both marginal edges of a groove 64 formed in the tubular body 60. An elongated indicator window 65 is formed in alignment with the row of switches 63 on the side of one tubular body 60 and this window is covered with a transparent plate 62. In the tubular body 60, a battery 66 is housed under the clip 62; a semiconductor integrated circuit 67 for achieving an operation based on the input data applied through the keyboard, a semiconductor integrated circuit 68 for applying the result of the operation to an indicator unit, and other circuit parts are housed under the keyboard; and an indicator unit 69 composed of, for example, photo diodes and associated elements for providing an indication of the result of the operation and a DC-DC convertor 70 for converting the voltage of the battery 66 into a predetermined voltage are housed in opposing relation to the transparent plate 65.

A power switch is provided at one end of a tubular body 60 on the side of the clip 62. A retaining ring 71 is screwed into the open end of the body 60 on the side of the clip 62 to make contact with a conductive ring 73 on an insulating disk 72 to press them toward the battery 66. A contact member 74 making contact with one electrode of the battery 66 extends through a centrally disposed aperture of the insulating disk 72 into a switch knob 75, and is fixed by a screw 77 to an end plate of a cylindrical insulating member 76 inside of the switch knob 75. The cylindrical insulating member 76 is bonded to the switch knob 75. A movable contact rod 78 is affixed to the contact member 74 in the cylindrical member 76 and this movable contact rod 78 is biased by a coiled spring 79 toward the insulating disk 72. On the insulating disk 72, a plurality of lugs 80 are formed at regular intervals and the conductive ring 73 has inward projections respectively extending between each pair of the lugs 80. Accordingly, when the switch knob 75 is rotated, the contact rod 78 is rotated to alternately get into and out of contact with the conductive ring 73. The conductive ring 73 is in contact with the retaining ring 71 and is electrically connected therethrough to the DC-DC converter 70. Thus, a power source switch for the miniature electronic calculator is provided. The battery 66 can be exchanged by removing the retaining ring 71.

Now, a mechanism for putting in and out the ball-point pen 61 will be described. A penholder 84 is threadably engaged with screw threads formed in a central aperture of a conical pen tip 83. A retaining ring 85 is rotatably mounted on the bottom of the pen tip 83 and is screwed on but can be removed from the body 60. The penholder 84 has inserted therein the ball-point pen 61 and split grooves (not shown) are formed in the inner end portion of the penholder 84 in its lengthwise direction. The ball-point pen 61 is resiliently held between the both side portions of the grooves. The retaining ring 85 has affixed thereto a stopper 86 and the penholder 84 is inserted into the stopper 86, which permits the movement of the penholder 86 in the direction of its insertion but prevents its rotational movement. Consequently, when the pen tip 83 is rotated, the penholder 84 threadably engaged therewith moves in its axial direction. A flange 87 is formed on the peripheral surface of the penholder 84 at its intermediate portion and this flange 87 engages with a stopper 88 formed on the inner wall of the central aperture of the pen tip 83, thereby to prevent the pen 61 from slipping out of the central aperture. When the pen 61 is pulled in, the stopper 88 engages with the abovesaid stopper 86 to limit further inward movement of the pen 61. The pen 61 can be replaced with a new one by removing the retaining ring 85 from the body 60 and then removing the pen 61 from the penholder 84. A style strip 51 is bonded to the body 60 on the side of the keyboard switch 63 and the keys and the transparent plate 65 are exposed to the outside through the style strip 51.

The present inventors have succeeded in producing a ball-point pen combined with the miniature electronic calculator which is as small as 153 mm long and 14 mm thick. Thus, the miniature electronic calculator can be built in usual personal belongings, for example, a cigarette gas lighter and, in such a case, the lighter can be formed about the size of a little large but ordinary portable lighter, and hence can be carried by anyone as usual. FIG. 13 shows the case in which a miniature electronic calculator employing the keyboard switch of this invention is built in such a cigarette lighter. A flame hole 91 is formed in one end face of a lighter case 90. The keyboard of this invention is mounted on one larger surface of the lighter case 90, as indicated by 63, an indicator part 69 is formed adjacent to the keyboard switch 63 and a power source switch 92 is also provided. On one side of the case 90, an ignition actuator 93 is provided. To avoid dissipation of the battery, a switch can be associated therewith so that charging of a capacitor is started with the operation of the ignition actuator 93.

In the foregoing, the number of keys used in the keyboard is five but this can be changed at will. Further, the number of switches operable with one key is four but is not limited specifically thereto.

It will be apparent that many modifications and variations may be effected without departing from the scope of the novel concepts.

What is claimed is:

1. A portable electronic calculator comprising:
   a body;
   a keyboard consisting of a plurality of keys housed in said body and exposed to the outside of said body through openings formed in the body, the keys of said keyboard being aligned with one another in a single row;
   an indicator for displaying the result of a calculation; said indicator being housed in the body and exposed to the outside of said body through an elongated opening formed in said body, said elongated indicator opening being disposed in alignment with said single row of keys;
   said keyboard including a plurality of resilient members each of which is retained at one end thereof by an engaging portion formed on the inside of one of said keys respectively, each of said resilient members being secured at its other end to a stationary portion of said body, each of said keys being normally held in a predetermined neutral position by its associated resilient member and being adapted to be tilted forwardly, backwardly, to the right, and to the left when the key is so depressed by the finger tip of a user on the front surface of the key;
   said keyboard further including a set of four make-and-break contacts housed in the body in opposing relation to the inside of each of said keys, different ones of said contacts being selectively actuated in accordance with the direction of tilting of the key when the key is tilted;
   an integrated calculator circuit housed in said body for receiving a signal based on the operation of each of the make-and-break contacts by the key operation to perform a calculation and to supply the result of the calculation to said indicator for viewing by the user through said elongated indicator opening; and
   a power source housed in said body for supplying power to said integrated calculator circuit and to said indicator.

2. The portable electronic calculator of claim 1 in which a recess is formed in the front surface of each of said keys to conform to the user's finger tip, the shape and dimensions of said recess being such that when the finger tip is urged against the front surface of one of said keys, the bulge of the finger tip snugly conforms to the recess in said key to permit the user to effect forward, backward, rightward and leftward tilting of the key with the finger tip pressed against the key.

* * * * *